United States Patent

Charbonnier

[15] 3,684,982

[45] Aug. 15, 1972

[54] FUNCTION GENERATOR AND VARIABLE CAPACITY DIODE OSCILLATOR EMPLOYING SAID GENERATOR

[72] Inventor: Roger Charles Charbonnier, Meudon, France

[73] Assignee: Adret-Electronique Vladimir Komarov, Trappes, France

[22] Filed: July 15, 1971

[21] Appl. No.: 163,544

[52] U.S. Cl. ...........331/177 V, 331/117 R, 307/229, 328/143, 328/144, 334/15

[51] Int. Cl. ...............................................H03b 5/12

[58] Field of Search.............331/36 C, 117 R, 117 V; 334/15; 332/30 V; 307/229, 230; 328/144, 145, 160

[56] References Cited

UNITED STATES PATENTS 3,519,954 7/1970 Parkyn ........................334/15

*Primary Examiner*—John Kominski
*Attorney*—William A. Drucker

[57] ABSTRACT

Function generator capable of furnishing from a voltage applied to its input, a function comprising a sum of terms respectively proportional to the different successive powers of said voltage. The generator comprises an analog multiplier having two inputs to which the voltage is applied and an output. There are means for reinjecting in the outputs an adjustable fraction of the output voltage of the analog multiplier.

4 Claims, 2 Drawing Figures

FUNCTION GENERATOR AND VARIABLE CAPACITY DIODE OSCILLATOR EMPLOYING SAID GENERATOR

The present invention relates to oscillators comprising one or more variable capacity diodes across which a given control voltage is applied so as to vary the frequency of the oscillations.

It is obviously desirable that said frequency be a linear function of the control voltage, which is a priori difficult to achieve bearing in mind the variation characteristics of the capacity of these diodes as a function of the control voltage. It is known to convert the frequency of the oscillator into a proportional voltage and to control the diode by the difference between this proportional voltage and the variable voltage of the control. In this way the oscillation frequency is governed by a value which varies linearly as a function of the control voltage. This method only operates correctly in respect of low-frequency modulation frequencies (for example not exceeding 10 KHz), owing to the large time constant introduced in the control by the frequency-voltage converting device.

To remedy this drawback it has been suggested to add to the oscillator a conventional function generator constituted by a plurality of cascaded diode cells. Such a generator permits establishing from the control voltage a non-linear voltage capable of compensating the lack of linearity of the diode and that of the oscillating circuit of the oscillator. However, it has the important drawback of being complicated and above all difficult to regulate, since each cell must be regulated separately until the linearity of the desired frequency has been obtained.

An object of the invention is to provide a function generator which is extremely simple and has only a very small number of regulations. The invention indicates the manner of associating it with a variable capacity oscillator so as to obtain a substantially linear variation of its frequency.

The function generator according to the invention is capable of furnishing, from a voltage applied to its input, a function comprising a sum of terms which are respectively proportional to the different successive powers of said voltage and comprises: an analog multiplier having two inputs to which said voltage is applied and an output; and means for re-injecting in said inputs an adjustable fraction of the output voltage of the analog multiplier.

The invention will be better understood from the ensuing description.

In the accompanying drawing:

FIG. 1 shows an oscillating circuit comprising a capacitor C of high capacity with respect to the capacity of the diode, a choke L and a variable capacity diode D.

Figures 1, 2:
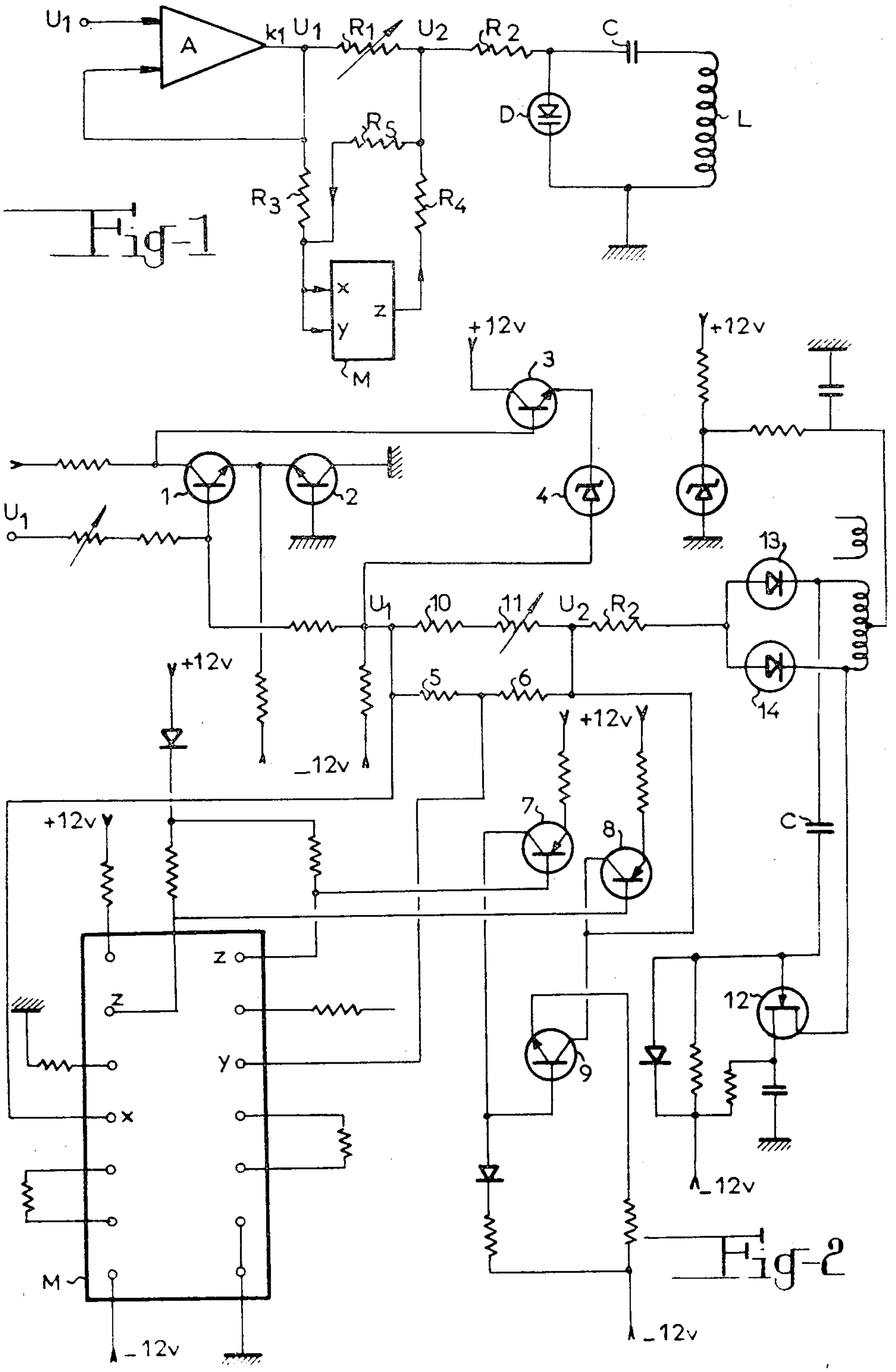
FIG. 1 is a diagram of the principle of a variable capacity oscillator associated with a function generator according to the invention.
FIG. 2 is the detailed diagram of a practical embodiment of the system shown in FIG. 1.

A voltage $U_2$ is applied to the terminals of the diode D through a resistor $R_2$ of high value which will not appreciably dampen the oscillating circuit.

It is well known that the internal capacity K of a variable capacity diode is a function of $U_2$ and that this function is highly non-linear. It is also known that the oscillation frequency F of the circuit L (C + K) is an inverse function of X.

Finally, if it is desired to construct an oscillator whose frequency is linearly variable as a function of a certain given control voltage $U_1$, it is obviously necessary to generate a voltage $U_2$ which is a predetermined function of $U_1$, the latter function being highly non-linear.

For this purpose, the illustrated device employs essentially a circuit known under the name of an analog multiplier. Such a circuit M is capable of generating at its output Z a voltage which is proportional to the product of the respective voltages applied to its inputs X and Y.

By way of non-limitative example, the device M can be an integrated M circuit MOTOROLA model MC 1495 manufactured by the Company.

For reasons explained hereinafter this multiplier receives through an impedance reducing amplifier.

There is obtained at the output of this amplifier a voltage $kU_1$ which is proportional to $U_1$ which is first directly applied to the diode D through resistors $R_1$ and $R_2$ connected in series.

Further, this voltage is applied to the terminals X and Y through a resistor $R_3$. Consequently, there is at the output Z a voltage proportional to $U_1^2$.

A resistor $R_4$ of very high value converts the output voltage Z into a current which flows in $R_5$, $R_3$, $R_1$ and results in a voltage drop in the resistor $R_1$ and therefore the introduction of a voltage proportional to $U_1^2$ at $U_2$.

For this, obviously $R_4$ must operate as a current generator, that is to say it must deliver a current at a very high impedance and the voltage $U_1$ must be applied to $R_1$ at a low impedance (whence the utility of the impedance lowerer A).

Further, the voltage drop across $R_5$ re-introduces a voltage proportional to $U_1^2$ at the inputs X and Y so that a voltage proportional to $U_1^3$ is generated at the output Z. By the same procedure, this voltage itself introduces a voltage proportional to $U_1^3$, on one hand, at $U_2$ and, on the other hand, at terminals X and Y. The procedure proceeds thus by the generation of terms at $U_1^4$, $U_1^5$, etc., so that there is generated a voltage $U_2 = k_1U_1 + k_2U_1^2 + k_3U_1^3 \ldots$.

By suitably regulating the value of the resistance of the resistor $R_1$, it is easy to arrange that the coefficients $k_1$, $k_2$, $k_3$ etc., have such values that the oscillation frequency is a substantially linear function of the input voltage $U_1$ (which may be verified by plotting the curve of the variation of said frequency).

FIG. 2 shows a practical embodiment of the diagram shown in FIG. 1.

The impedance lowering device is an amplifier having three transistors 1, 2 and 3 connected in the emitter follower arrangement.

A Zener diode 4 connects the emitter of the transistor 3 to the output terminal $k_1U_1$ of the amplifier. The analog multiplier M, of the aforementioned type with reference to FIG. 1, has been shown with its different terminals, those on the left and those on the right, performing a symmetrical function in this circuit. It can be seen that the terminal X on the left directly receives the voltage $K_1U_1$ and the terminal Y on the right receives a proprotional voltage through a dividing circuit constituted by two resistors 5 and 6.

The two terminals Z of the analog multiplier are connected to the two inputs of a current generating circuit equivalent to the very high value resistor $R_4$ of FIG. 1.

This circuit comprises three transistors 7, 8 and 9 and is arranged to have a single output terminal connected to the two resistors 5 and 6.

The current it generates, at an extremely high impedance, flows in the resistors 5 and 6 (which, taken together, perform the function of the resistor $R_5$ shown in FIG. 1) in two resistors 10 and 11 (the resistor 11 being variable; together, they perform the function of the resistor $R_1$ shown in FIG. 1) and in a resistor $R_2$.

There has been shown by way of example an oscillator of the Colpitts type comprising a field-effect transistor 12, two variable capacity diodes 13 and 14, and a capacitor C. It is unnecessary to describe in more detail the impedance lowerer, the multiplier, the current generator and the oscillator which are well known per se and may be subjected to many modifications.

In the described embodiment, the two resistors 5 and 6 are equal in value so that the voltage re-injected at Y by the current generator has been divided by two, which has been found advantageous in practice for obtaining an as good as possible linearity of the law of variation of the oscillation frequency (it has been possible to obtain a linearity which is correct to within ± 1 percent).

It should be mentioned that the circuit described and shown in FIGS. 1 and 2 operates as an open loop. As the bandwidth of the logic multiplier may be large (for example of the order of 1 MHz), the device correcting the law of frequency variation which is thus added to the oscillator, does not limit the bandwidth of the latter and this constitutes an advantage of the invention.

Further, the regulation which permits the obtainment of a linear variation of the frequency only concerns the resistor $R_1$ (or possibly also the resistor $R_5$). It is therefore very simple and can be effected rapidly.

It will be understood that various modifications may be made in the circuit described and illustrated without departing from the scope and spirit of the invention.

Moreover, the function generating circuit constituted by the analog multiplier, the resistor $R_1$ and the resistors $R_4$ and $R_5$ which establish a feedback between its output and its two inputs may receive other applications. That described is however of particular interest.

I claim:

1. An oscillator including a variable capacity diode, a function generator, capable of furnishing from an input voltage applied thereto, a function comprising a sum of terms respectively proportional to the different successive powers of said input voltage said generator comprising an analog multiplier having two inputs to each of which said input voltage is applied, and an output; and means for re-injecting in said inputs an adjustable fraction of the output voltage of the analog multiplier, and means connecting the output of said function generator to said variable capacity diode.

2. An oscillator as claimed in claim 2, further comprising an impedance lowering circuit having a control input and an output, said output being connected to the two inputs of the analog multiplier, said output being connected to the variable capacity diode through at least one adjustable resistor, said last means comprising at least one element equivalent to a high resistance.

3. An oscillator as claimed in claim 3, wherein said element comprises a current generating circuit, a resistor connecting said current generating circuit to the inputs of the analog multiplier.

4. An oscillator as claimed in claim 3, wherein said adjustable resistor is connected to the variable capacity diode through a resistor of high value.

* * * * *